No. 691,322. Patented Jan. 14, 1902.
F. R. PACKHAM & G. P. OATES.
GRAIN DRILL.
(Application filed Nov. 20, 1900.)
(No Model.) 2 Sheets—Sheet 1.
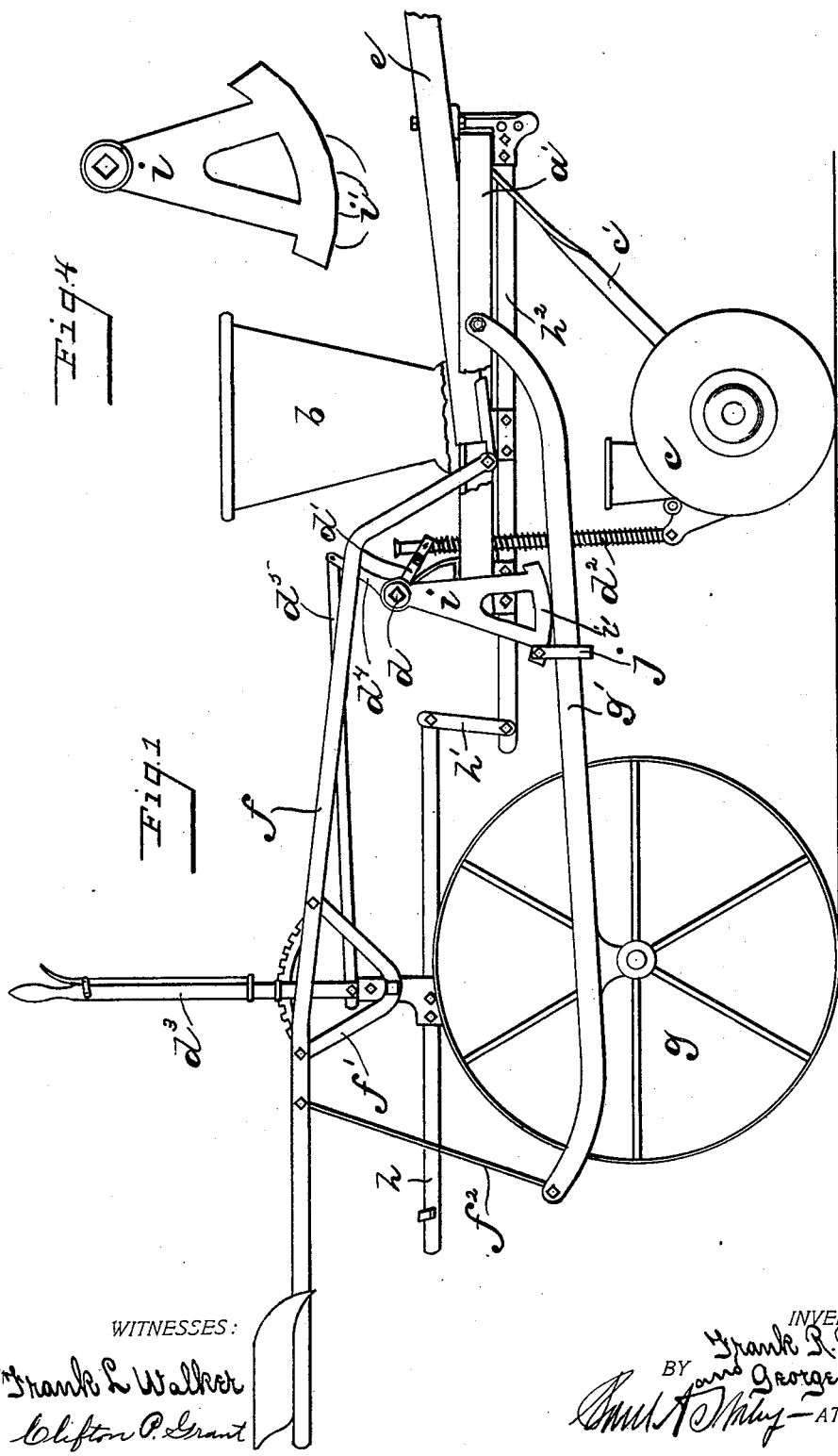

No. 691,322. Patented Jan. 14, 1902.
F. R. PACKHAM & G. P. OATES.
GRAIN DRILL.
(Application filed Nov. 20, 1900.)
(No Model.) 2 Sheets—Sheet 2.
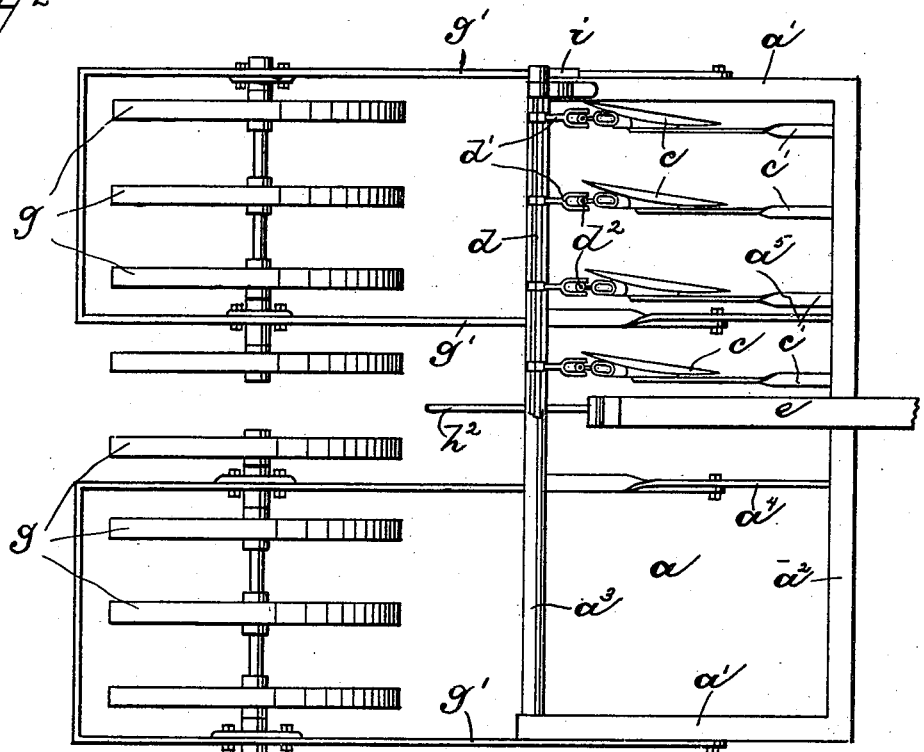
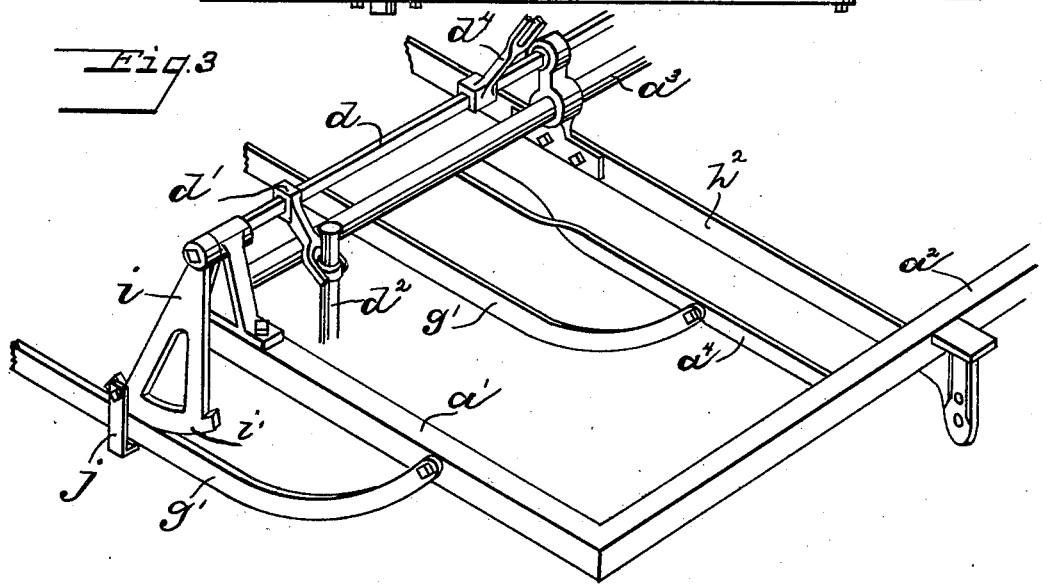
WITNESSES:
T. Llewellyn Walker
Edmond J. Ogden.
INVENTORS
Frank R. Packham
George P. Oates
BY
ATTORNEY.

UNITED STATES PATENT OFFICE.

FRANK R. PACKHAM AND GEORGE P. OATES, OF SPRINGFIELD, OHIO, ASSIGNORS TO THE SUPERIOR DRILL COMPANY, OF SPRINGFIELD, OHIO, A CORPORATION OF OHIO.

GRAIN-DRILL.

SPECIFICATION forming part of Letters Patent No. 691,322, dated January 14, 1902.

Application filed November 20, 1900. Serial No. 37,184. (No model.)

*To all whom it may concern:*

Be it known that we, FRANK R. PACKHAM and GEORGE P. OATES, citizens of the United States, residing at Springfield, in the county of Clark and State of Ohio, have invented certain new and useful Improvements in Grain-Drills, of which the following is a specification.

Our invention relates to improvements in grain-drills; and it especially relates to grain-drills of the class known as "low-down" or "press" drills, in which the side carrying or driving wheels are dispensed with.

The object of the invention is to provide means for preventing oscillation of the frame and hopper of the machine.

A further object of the invention is to furnish a permanent stop-motion, lever-controlled, that practically gages the depth to which the furrow-openers can drop or rise, at the same time allowing them to conform to the contour of the ground and also to maintain an equal pressure at all times on the furrow-opening devices throughout the entire series.

Our invention consists in the constructions and combinations of parts hereinafter described, and set forth in the claims.

In the accompanying drawings, Figure 1 is a side elevation of a machine embodying our invention, one of the side rails of the frame being shown partly broken away. Fig. 2 is a plan view of the same with some of the parts removed. Fig. 3 is a perspective view of a portion of the same. Fig. 4 is a detail view of the cam projection.

Like parts are represented by similar letters of reference in the several views.

In the said drawings, $a$ represents the frame of the machine, which consists of side bars $a'$ $a'$ and transverse bars $a^2$ $a^3$, connecting the side bars at the front and rear, respectively, these transverse bars being further connected by longitudinal bars $a^4$ $a^5$.

$b$ represents the hopper, which is mounted on the frame in the usual way, and $c$ represents the furrow-openers, which are preferably in the form of disks and are journaled in the drag-bars $c'$, said bars being pivotally connected to the front part of the frame. Mounted in suitable bearings at the rear of the frame is a rock-shaft $d$, having lifter or presser arms $d'$, with bifurcated ends, which extend over links $d^2$, connected to the furrow-openers, springs being interposed between the said arms $d'$ and the supports for the furrow-openers, so as to exert a yielding pressure on the furrow-openers, and the arms $d'$ being adapted to engage the upper part of the links, so as to raise the furrow-openers from the ground in the usual manner when the rock-shaft is rotated in its bearings by means of the lifting and lowering lever $d^3$, which is connected to the arm $d^4$ of the rock-shaft by means of the link $d^5$.

$e$ represents the tongue, which is secured to the frame in any suitable manner, and pivoted to the frame and extending rearwardly therefrom is a seat-support $f$, which is supported at its rear end by the traction-bars for the press-wheels, hereinafter referred to, by means of upright supports $f^2$. Said seat-support $f$ also supports the graduated segment $f'$ for the lever $d^3$, which is bolted thereto, as shown.

$g$ represents press-wheels, eight of which are shown in the present machine mounted in two gangs of four each. Each gang is mounted on a common shaft and is pivoted to the main frame of the machine at a point forward of the center thereof by means of traction-bars $g'$, one of said traction-bars of each gang being connected to the side rail $a'$ and the other to the longitudinal bars $a^4$ $a^5$.

$h$ represents a foot-lever, which is rigidly connected to the lower end of the lever $d^3$ and works in conjunction with the same for raising and lowering the furrow-openers, and is also connected by a link $h'$ to a bar $h^2$, secured to the front and rear portions of the main frame.

In field practice with low-down or press drills, as described, there being no end wheels to support the frame the same has heretofore rested upon the springs, which were connected to the furrow-openers, and the absence of the end wheels permitted the frame to which the furrow-openers are attached and the grain-hopper mounted thereon to drop at either end, sometimes to a distance of several inches, which materially affected the proper formation of the seed-trench, planting the grain too shallow or too deep. Also in planting in uneven ground it frequently happens that the furrow-openers on one side of the machine in dropping down would cause the opposite side of the frame to rise, thus lifting the furrow-openers on that side of the machine partly if not sometimes wholly from the ground and causing the opposite ones to cut too deeply. To obviate these difficulties, we have provided means by which the frame may be supported rigidly and evenly at both sides at such times as it is inclined to oscillate or tip and by which a part of the weight of the same may be transferred to the traction-bars for the press-wheels. We have accomplished this by providing cam-shaped projections $i$, rigidly connected at each end of the rock-shaft $d$. The lower ends of these cams are adapted when the furrow-openers are in the ground to bear lightly on the upper surfaces of the traction-bars $g'$ and are preferably provided with a series of flat bearing-surfaces $i'$, (shown in Fig. 4,) though this is not necessary. When the furrow-openers are in an elevated position, the cams $i$ will be disengaged from the traction-bars; but as the pressure is applied to the furrow-openers the projection $i$ by reason of the cam-shaped ends will follow the upper surface of the traction-bars and bear lightly thereon when the frame is in a horizontal position, but are adapted when the frame is inclined to oscillate or tip to contact with the traction-bars, and thus cause the bars to act as stops, preventing the frame from dropping down at either side, and thus maintain the frame and hopper in the same relative position with reference to the press-wheels. It will also be seen that interference with the furrow-openers by reason of the oscillation of the frame will be obviated and an equal pressure on the furrow-openers will be maintained throughout.

It should be explained that in the operation of applying pressure to the furrow-openers through the rock-shaft and presser-arms the frame will be moved in a downward direction and in an upward direction when the pressure is being removed and the furrow-opening devices taken out of the ground. Hence it is obvious that the front ends of the traction-bars will be lowered and that the same will pivot upon the axle of the press-wheel, thus changing the relative relations of said bars and the frame, and hence each notch of the lever-arc used will represent a different relative relation of the traction-bars and the side of the frame, and it is this fact that enables us to use the cam-like stop in combination with the lever-operated pressure device.

We have selected the cam principle as being the most simple and thoroughly applicable to the present construction; but it is obvious that it would not be a departure from the spirit of the invention to use a sliding wedge or a combination of jointed levers or to use eccentric gears or any other well-known device that could be lever-controlled, acting in conjunction with the pressure device and governed by different graduations in an arc holding the lever in a desired position.

$j$ represents loops secured to the bottom of the cam projection $i$, loosely encircling the traction-bar at either side of the machine, which, when the furrow-openers are lifted from the ground for transportation, will, by engaging the lower ends of the traction-bars, hold the frame in a level position for transportation.

Having thus described our invention, we claim—

1. In a seeding-machine, a main frame, an auxiliary frame pivotally connected to said main frame, devices for lowering said main frame, and stop devices connected thereto for holding said auxiliary frame in proper adjustment with said main frame.

2. In a seeding-machine, a main frame, an auxiliary frame connected to said main frame, a lever for raising and lowering said main frame, and devices connected to said lever to adjust the relative positions of said frames and to automatically hold said main frame against oscillation, substantially as specified.

3. In a seeding-machine, a main frame, an auxiliary frame connected to said main frame, press-wheels supporting said auxiliary frame, means for raising and lowering said main frame, and stop devices connected to said means for automatically holding said main frame against oscillation.

4. In a seeding-machine, a main frame, an auxiliary frame pivotally connected to said main frame, press-wheels connected to said auxiliary frame, means for raising and lowering said main frame, and stop devices adapted to engage with said auxiliary frame and connected with said raising and lowering mechanism, for the purpose of automatically holding said main and auxiliary frames in the proper adjustment.

5. In a seeding-machine, a main frame, furrow-openers connected to said frame, press-wheels also connected to said frame, means for lifting said furrow-openers and devices, normally causing said press-wheels to form a separate additional frame to prevent oscillation thereof, but further adapted to be moved from normal position by said means, for the purpose of lifting said furrow-openers out of the ground.

6. In a seeding-machine, a main frame, furrow-openers connected to said frame, press-wheels also connected to said frame, means for applying pressure to said furrow-openers, and devices operated by said means to cause said press-wheels to form a support for said frame to prevent oscillation thereof, substantially as specified.

7. In a seeding-machine, a main frame and a hopper mounted thereon, furrow-openers pivotally connected to said frame, means for applying pressure to said furrow-openers consisting in part of a rock-shaft mounted on said frame, press-wheels for said furrow-openers, bars for pivotally connecting said press-wheels to the main frame, and devices connected to the said rock-shaft adapted to be brought in proximity to said bars when the rock-shaft is rotated to apply pressure to the furrow-openers, said devices being adapted to engage said bars to prevent oscillation of the frame, substantially as specified.

8. In a seeding-machine, a main frame, furrow-openers pivotally connected thereto, a rock-shaft on said frame adapted to be operated by a lever, connections between said rock-shaft and said furrow-openers for lowering and raising the same, press-wheels for said furrow-openers, traction-bars pivotally connecting said press-wheels to said frame, and cam-shaped projections connected to said rock-shaft adapted to engage said traction-bars, substantially as specified.

9. In a seeding-machine, a main frame, furrow-openers connected thereto, press-wheels for said furrow-openers, bars pivotally connecting said wheels to said frame at a point forward the center thereof, lever-controlled devices on said frame for applying varying degrees of pressure to said furrow-openers, and means on said frame, connected with said devices, for engaging with said bars and thus limit the downward movement of said frame, substantially as specified.

10. In a seeding-machine, a main frame, press-wheels, traction-bars connecting said press-wheels to the said frame, a rock-shaft mounted on said frame, cam-shaped projections connected to said rock-shaft and adapted to engage said traction-bars, and a lever for operating said rock-shaft, substantially as specified.

11. In a seeding-machine, furrow-opening devices, a main frame yieldingly supported thereon, press-wheels, side bars pivotally connecting said wheels to said frame at a point forward of its center, and devices on said frame to engage said bars in the rear of said pivoted connection to prevent the oscillation of said frame.

12. In a seeding-machine, furrow-opening devices provided with presser-springs, a main frame mounted on said springs, press-wheels for said furrow-opening devices, bars connecting said wheels to said frame, and means for limiting the downward movement of said frame by said bars, substantially as specified.

13. In a seeding-machine, a main frame, press-wheels, traction-bars connecting said press-wheels to said frame, loops or projections connected to said frame adapted to engage the under side of said traction-bars, substantially as and for the purpose specified.

14. In a seeding-machine, furrow-openers, a main frame supported thereon, press-wheels for said furrow-openers and traction-bars connecting said press-wheels to said frame, means for raising said furrow-openers and thus transfer the weight of said frame to said press-wheels, and means on said frame for engaging said bars to prevent oscillation of said frame, substantially as specified.

In testimony whereof we have hereunto set our hands this 10th day of November, A. D. 1900.

FRANK R. PACKHAM.
GEORGE P. OATES.

Witnesses:
CHAS. I. WELCH,
FRANK L. WALKER.